United States Patent
Schweizer

[11] 3,799,671
[45] Mar. 26, 1974

[54] RECORDING HEAD FOR AN OPTICAL CORRELATION VELOCITY METER

[75] Inventor: John Schweizer, Wabbern, Switzerland

[73] Assignee: Hasler, AG, Bern, Switzerland

[22] Filed: Feb. 22, 1972

[21] Appl. No.: 227,936

[30] Foreign Application Priority Data
Feb. 26, 1971 Switzerland............. 2701/71

[52] U.S. Cl..................... 356/28, 356/114
[51] Int. Cl. ............................. G01p 3/36
[58] Field of Search .......... 356/28, 108, 114, 118

[56] References Cited
UNITED STATES PATENTS
3,552,857  1/1971  Hock et al. ............... 356/118
3,508,066  4/1970  Agar ....................... 356/28
3,227,888  1/1966  Shepherd et al. ......... 356/28
3,410,624  11/1968  Schmidt ................... 356/114

OTHER PUBLICATIONS
Thesis from Tech. Univ., May, 1968, Delft, Netherlands, pp. 14, 15.

Primary Examiner—Maynard R. Wilbur
Assistant Examiner—S. C. Buczinski
Attorney, Agent, or Firm—Brady, O'Boyle & Gates

[57] ABSTRACT

In a recording head for an optical correlation velocity meter there is provided means having a single lens for illuminating two points on the surface of an object moving relative to the recording head and means for transmitting light reflected from said two points to a pair of photo-electric devices which feed signals to an electronic evaluator which calculates the relative velocity of the object.

5 Claims, 3 Drawing Figures

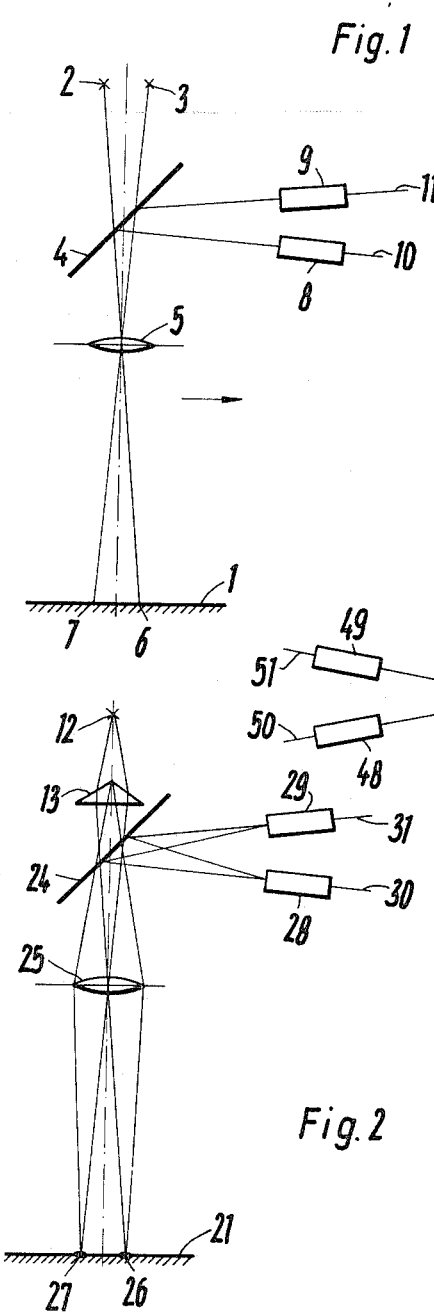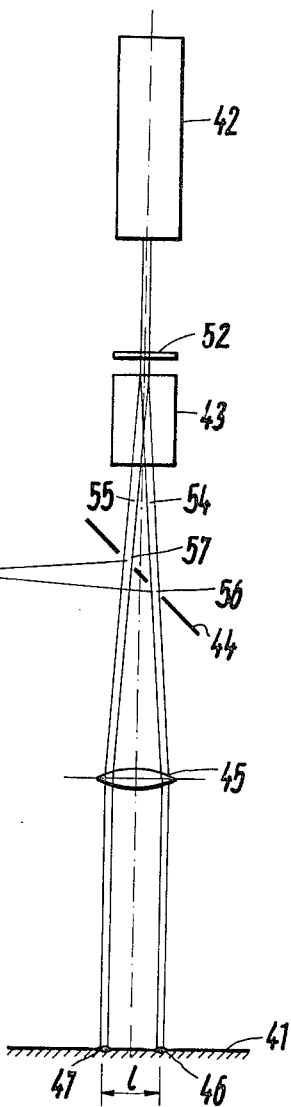

RECORDING HEAD FOR AN OPTICAL CORRELATION VELOCITY METER

The invention concerns a recording head for an optical correlation velocity meter for the measurement of the relative velocity between the recording head and a surface opposite to it by means of a comparison of the light reflected by two illuminated surface points which, having a fixed location by comparison to the recording head are moved one behind another on a track on the surface mentioned.

Correlation velocity meters have previously been proposed in which the light reflected from the surface points is received by two photo-electric converters and gives rise to two electric signal voltages which have a proportion of noise in the signal. Both voltages have the same character, but are displaced in time one from the other to the extent of the time required to pass through the distance between the two surface points at the speed concerned. The potential derived from the leading surface point is in this way delayed until the integrated product of the instantaneous value of the two potentials becomes a minimum (correlation). The relative velocity between the recording head and the surface opposite to it is given with the delay time so arrived at. The measurement method is for example described in British Pat. No. 964,581.

An object of the present invention is to provide a recording head which is simple to incorporate and insensitive in operation and furnishes particularly well-contrasted signals. The present invention is characterised by at least one light source for the emission of concentrated light rays, a system of lenses with a single objective, which system guides the light rays onto the two surface points mentioned and with the help of which a part of the light reflected from each of the two surface points is led in each case to one photo-electric converter, and a beam divider for the separation of the illuminating and the reflected beams. The collection of the illuminating and the reflected beams for both surface points is effected by a reading head which is smaller, contains less material and is more easily incorporated and serviced than a pair of reading heads with two light sources and two objectives. Also it is not possible for the distance between the two surface points to be altered.

In order that the present invention be more readily understood, embodiments thereof will now be described, by way of example only, with reference to the accompanying drawings, in which:

FIG. 1 shows a recording head with two light sources;

FIG. 2 shows a recording head with one light source and a double prism in the path of the lighting beam;

FIG. 3 shows an arrangement with one light source and two polarisation prisms.

FIG. 1 shows the optical beam path in a recording head with two light sources. Reference numeral 1 is a surface, e.g., the surface of a railway rail, opposite which the illuminating and recording head is horizontally moved from left to right or from right to left. It contains two light sources 2 and 3 which can be constituted by semi-conductor lasers which have a very small radiating surface. The two light sources are focussed by the lens 5 on two surface points 6 and 7 on the surface 1 respectively, which lie on a path in the direction of motion. These surface points are thus fixed in location relative to the recording head and are moved along the surface of the rail with reference to the recording head. If for example, the recording head is moved from left to right, as indicated by an arrow, then the surface points 6 and 7 come to lie one after the other, with a time interval which is dependent upon the spacing of their locations and upon the relative velocity of the recording head towards the surface, upon the same point of this surface. The light reflected from the surface point 6 is directed by way of the lens 5 and a beam divider 4 onto a photo-electric converter 8, and in the same way the light from the point 7 is reflected onto the photo-electric converter 9. Electric signal voltages occur in the converters 8, 9 which are conducted through the wires 10 and 11 respectively to an electronic measurement circuit not shown. The beam divider can consist of a half translucent mirror or of mirror elements (bars) displaced one from the other or of any other known device.

FIG. 2 shows the beam path in a recording head with a single light source 12. The light from the source 12 is directed through a beam divider 24 and lens 25 onto a plane surface 21. By means of a double-wedge prism 13 the beam of light coming from the light source 12 is split up, so that two images 26 and 27 of the light source result upon the plane surface 21. The light reflected from the images 26, 27 is transmitted through the lens 25 and the half translucent mirror 24 onto two photo-electric converters 28 and 29, which are connected by the conductors 30 and 31 to an electronic evaluating circuit. The manner of functioning is the same as for FIG. 1.

FIG. 3 shows a further arrangement which works with one light source 42. This light source is constituted by a laser. The beam of light emitted from the light source 42 passes through a polarisation prism 43, which effects a splitting of the beam into the two beams 54 and 55. A prism of this kind is also termed a Wollaston or Rochon prism. The two beams are polarised in two planes perpendicular to one another. The beams pass through the beam divider 44 and through the lens 45 onto the two surface points 46 and 47 which lie on the surface 41. The light is partially reflected, with nothing being changed on the polarisation plane of the light. The reflected light beams pass after reflection at the beam divider 44 through a second polarisation prism 53. This again splits the beams into two parts, one of which falls on the photo-electric converter 48, the other on the photo-electric converter 49. The orientation of the polarisation prism 53 is so chosen that only beam portions that have the same polarisation direction as the beam 54 reach the photo-electric converter 48 and only beam portions which have the polarisation direction of the beam 55 arrive at the photo-electric converter 49. The converters are connected through the wires 50 and 51 with an electronic evaluation device, not shown.

In the case of the beam path shown in FIG. 3 the beam has a very small diameter at the entry of the first polarisation prism. This can be effected by means of an aperture 52 or through an optical system. The beam divider 44 can in this case comprise a mirror with two small holes 56, 57. These two beams are directed parallel through the objective 45 and light upon the surface points 46 and 47 of the face 41. Since the beams are parallel, the distance $l$ of the two surface points is not dependent upon the distance of the face 41 from the objective 45.

As a result of the orientation mentioned of the second polarisation prism 53, only light energy from the surface point 46 reaches the photo-electric converter 48, and only the light energy from the surface point 47 arrives at the photo-electric converter 49. (Apart from any chance illumination of the surface points from an outside source, which is however slight compared to the lighting through the recording head and which is further weakened through the polarisation in the second polarisation prism.)

For that reason it is not harmful if through lack of sharpness of the optical image light from the surface point 46 for example should reach the photo-electric converter 49. This light is suppressed by means of the second polarisation prism 53. For this reason also the arrangement is insensitive to alterations of the distance from the surface 41 to the objective 45.

In the case of the optical arrangement shown in FIG. 3 it is also possible for another beam path (not shown) to be used, in such a way that a broader beam is obtained at the entry of the first polarisation prism 43 and the beams leaving the prism are focussed through the objective 45 upon two points of the surface 41.

It is known that laser beams can be exceptionally finely focussed, so that for example the illuminated surface points 46 and 47 have diameters of less than 100 $\mu$m. For that reason it is also possible for the spacing of the two surface points to be very greatly reduced, for example to 1 mm and less. Thus the time lapse between these two points is so small that movement components of the recording device which harmonise with the direction of the mean progression no longer have any significance. Further through the employment of laser beams, because of the coherence of these beams and because of the smallness of the light points, the contrast of the reflected light becomes considerably enhanced compared to the scanning of larger areas, so that the evaluation is made easier. Because of the small size of the distance $l$ it is difficult to separate the beams emanating from the two surface points 46 and 47 by means of focussing optics, while a differentiation on the basis of the different polarisation of the two beams is even possible down to distances the size of the diameters of the surface points without complicated adjustment.

It is obviously possible with all the arrangements described to exchange the positions of the light source and the photo-electric converter, so that the photo-electric converters become located in the vicinity of the objective axis and the light sources on an axis perpendicular to this. Then in the place of the mirror with small holes of FIG. 3, two very small mirrors would be used, which must be rather larger than the beam diameter.

I claim:

1. A recording head for an optical correlation velocity meter for the measurement of the relative velocity between the recording head and a surface opposite to it by means of a comparison of the light reflected from a first and a second illuminated surface point, which are fixed in relation to the recording head and are moved along a path one behind the other on the surface referred to, the recording head comprising a light source, a prism dividing the light of said light source into a first and a second illuminating light beam, a single objective which directs the first light beam onto the first surface point and the second light beam onto the second surface point, a semi-transparent mirror connected in the path of said first and second light beams between said prism and said objective, said objective and said mirror forming an image of the first surface point at a first location and an image of the second surface point at a second location, and a first and a second photo-electric converter connected at said first and second location respectively.

2. A recording head as claimed in claim 1, wherein said prism is a first polarization prism, and including a second polarization prism located between the semi-transparent mirror and the photo-electric converters which transmits both the beams which originate from the first and second surface points respectively and are polarized in planes perpendicular to one another onto the first and second photo-electric converters respectively, and weakens any light scatter from the first or second surface points respectively falling upon the second and first photo-electric converter respectively.

3. A recording head as claimed in claim 1, wherein the illuminating beams are focussed on to the surface points.

4. A recording head as claimed in claim 1, wherein the surface points illuminated from the objective have a diameter of up to 100 $\mu$m and a mutual spacing of up to 1 mm.

5. A recording head as set forth in claim 2, wherein the virtual point in the first polarization prism from which the first and second light beam emerge is located in the focal point of the objective.

* * * * *